L. McEVOY.
WATERPROOF COAT.
APPLICATION FILED NOV. 20, 1918.
1,359,999.  Patented Nov. 23, 1920.
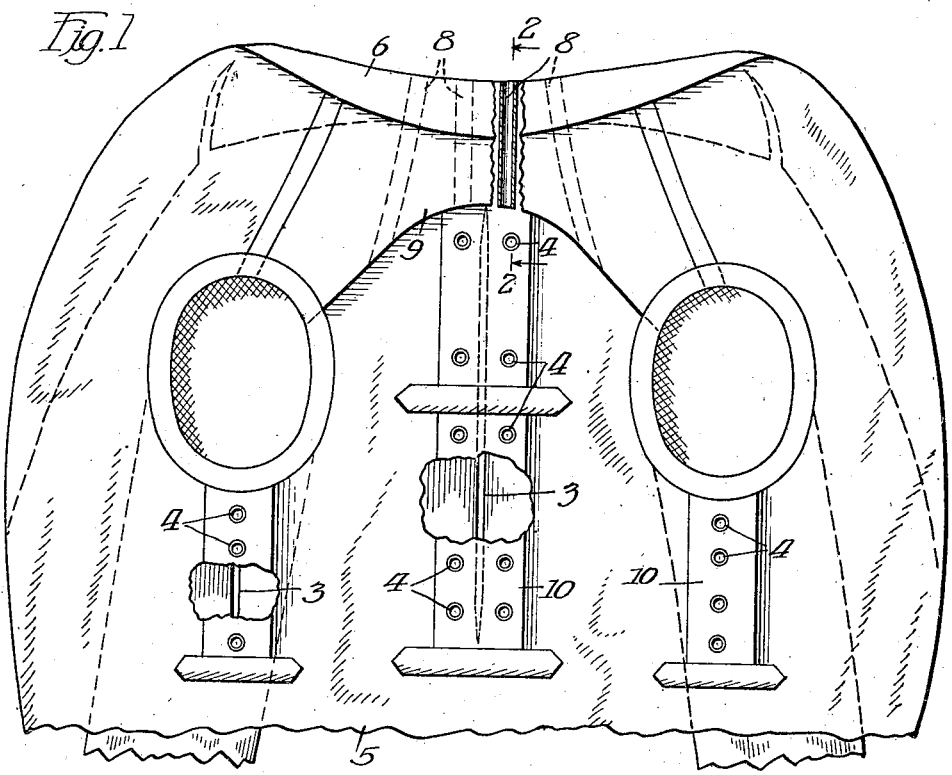
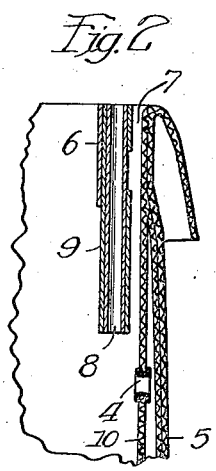
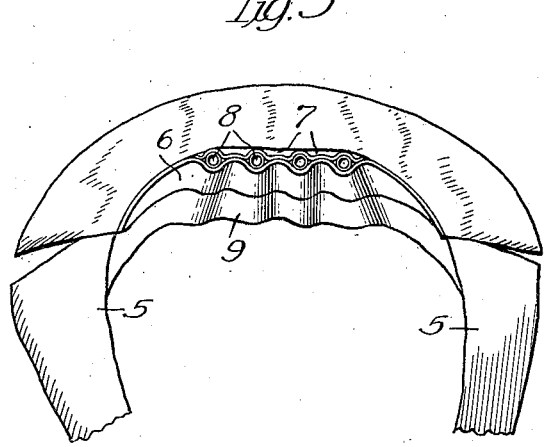
Witness:
L. W. Novauder
Inventor:
Luke McEvoy,
By E. J. Andrews
atty.

UNITED STATES PATENT OFFICE.

LUKE McEVOY, OF CHICAGO, ILLINOIS.

WATERPROOF COAT.

1,359,999. Specification of Letters Patent. Patented Nov. 23, 1920.

Application filed November 20, 1918. Serial No. 263,415.

*To all whom it may concern:*

Be it known that I, LUKE McEVOY, a subject of the King of Great Britain, but having taken out my first papers as a citizen of the United States, residing at Chicago, in the county of Cook and State of Illinois, have invented certain new and useful Improvements in Waterproof Coats, of which the following is a specification.

This invention relates to water-proof coats, and has for its object the construction of such coats in such a manner as to provide for suitable ventilation thereof, particularly when the coat is buttoned more or less snugly around the body.

Of the accompanying drawings Figure 1 is a view of a portion of the inner side of a rain coat embodying the features of my invention. Fig. 2 is a sectional view of the same along the line 2—2; and Fig. 3 is a plan view of the collar of the coat.

As is well understood when a water-proof coat is worn for any length of time, and especially when snugly buttoned around the body, the air between the body and the coat becomes warmed by the body, and more or less saturated with perspiration from the body. The front portion of the coat is usually more or less ventilated by means of the openings even when the coat is buttoned, and particularly by means of the low loose collar in front; but the rear of the coat, being ordinarily entirely closed, and the rear portion of the collar fitting snugly around the collar of the wearer, ventilation is ordinarily very imperfect. It is well known, also, that when the air becomes heated it becomes less dense and hence is forced upwardly by the surrounding air, if any opportunity to move upwardly is allowed; and this is particularly true with moist air; because as the air becomes more and more saturated it becomes less dense, due to the molecules of water replacing substantially equal numbers of molecules of air and being materially lighter than the molecules of air.

With ordinary rain coats there is nothing to prevent the air from passing upwardly between the lower portion of the coat and the body; and if suitable openings are provided at the upper portion of the coat, particularly around the back of the collar, the rarer air, due to the increased temperature and moisture will be forced upwardly, and a more or less continuous current of air will flow upwardly between the coat and the body. But to allow freer passage of the outer air inwardly, I provide the ventilating openings 3 in the back of the coat and under the arms, and the openings 4 through the strips 10, which cover the openings. To allow the air to pass upwardly I provide, in the coat 5, an inner collar or stand 6, which may be made in any suitable shape. I prefer the shape indicated in Fig. 1, the end portions of the stand being fastened firmly to the body of the fabric of the coat; but the central portion being disconnected therefrom at both the upper and the lower edges. By this arrangement a passageway 7 is formed leading from the space between the coat and the body below the neck and passing upwardly out of the coat between the outer collar and the stand. And by providing suitable means for maintaining this passageway open substantially at all times, even when the collar fits snugly around the collar of the wearer and the coat is tightly buttoned, the ventilation is materially improved. Such means may consist of any suitable arrangement for holding the stand away from the collar of the coat. I prefer for this purpose one or more rubber tubes 8 extending entirely through the passageway, so as to hold the outer and inner collar of the coat more or less away from each other; thus keeping the passageway 7 open and allowing passageways through the tubes, the tubes being of sufficient strength and size to remain open at substantially all times and to pass sufficient air for the purpose. By having a plurality of these tubes, a plurality of passageways are formed between the tubes as well as through the tubes themselves; and by having the ends extend clear up to the upper surface of the collar, as indicated, and for a material distance below, suitable ventilation is provided for. In order to more suitably support the tubes I provide a lap 9 extending downwardly from the stand, and prefer to attach the tubes thereto.

When the coat is worn the outside air presses inwardly from beneath the coat or through the openings 3 and 4, and forces the less dense air upwardly and out through the passageway 7, and through the tubes 8.

It is to be understood, however, that material modifications may be made in the arrangement of the ventilating passageways without materially departing from the spirit of my invention as disclosed by the following claims.

I claim as my invention:

1. In a rain-coat a band of fabric fixed to the inner surface of the upper rear portion of said coat, the upper edge of said band being substantially even with the upper edge of the rear collar of said coat, and means for maintaining an open passageway between the central portion of said band and said coat, said means comprising tubes extending from substantially even with said edges and for a material distance downward, whereby the passageway is at all times maintained open clear up to the upper edge of the coat collar.

2. In a rain-coat a band of fabric fixed to the inner surface of the upper rear portion of said coat, the upper edge of said band being substantially even with the upper edge of the rear collar of said coat, and means for maintaining an open passageway between the central portion of said band and said coat, said means comprising rubber tubes extending from substantially even with said edges for a material distance downward, said coat having openings through the back portion thereof.

In testimony whereof, I hereunto set my hand.

LUKE McEVOY.